M. F. PANE.
NUT LOCK.
APPLICATION FILED AUG. 7, 1911.

1,036,141.

Patented Aug. 20, 1912.

Witnesses
Cora N. Handy.
Juana M. Fallin.

Inventor
M. F. Pane.

By _____, Attorneys.

UNITED STATES PATENT OFFICE.

MARTIN F. PANE, OF CHICAGO, ILLINOIS.

NUT-LOCK.

1,036,141.  Specification of Letters Patent.  Patented Aug. 20, 1912.

Application filed August 7, 1911. Serial No. 642,630.

*To all whom it may concern:*

Be it known that I, MARTIN F. PANE, citizen of the United States, residing at Chicago, in the county of Cook and State of Illinois, have invented certain new and useful Improvements in Nut-Locks, of which the following is a specification.

This invention has relation to nut locks, and has for its object to provide upon a nut means for positively and securely engaging a bolt of peculiar configuration, whereby the nut will be positively locked upon the bolt and cannot be detached from the same without mutilating or destroying some of the parts of the device.

With this object in view, the bolt is provided at one end with a head of any desired pattern and is slightly tapered at its other end. The threaded portion of the bolt is provided with a series of longitudinally disposed slots. The nut is provided with the usual threaded opening adapted to engage the thread on the bolt and is provided with a shoulder in which is secured a spring member of peculiar configuration and which is adapted to enter at its free end one of the grooves upon the bolt. An abutment is provided upon the nut and a locking member is adapted to be inserted between the abutment and the free end portion of the spring, whereby the spring is positively held in engagement with the groove in the bolt.

Figure 1:
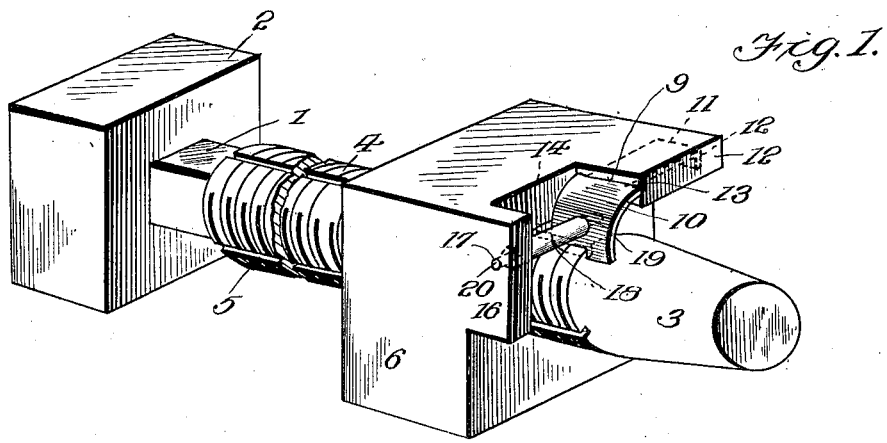
Figure 2:
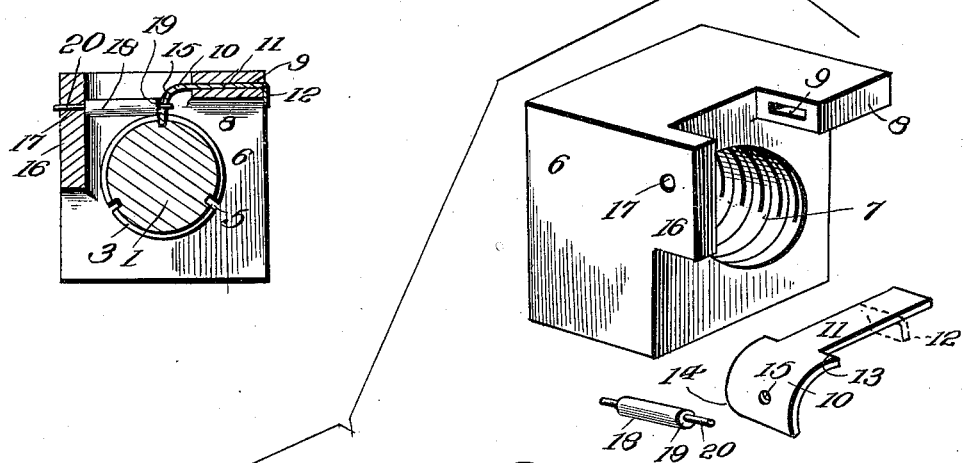
Figure 3:
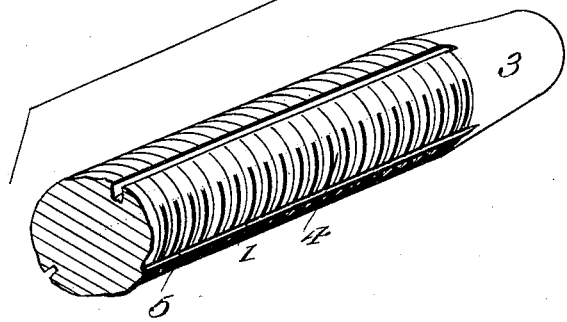

In the accompanying drawing: Figure 1 is a perspective view of the bolt and nut lock; Fig. 2 is an end view of the same; Fig. 3 is a perspective view of the parts separated.

Corresponding and like parts are referred to in the following description and indicated in all the views of the accompanying drawing by the same reference characters.

The bolt 1 is provided at one end with a head 2 and at its other end with a tapered extremity 3. The intermediate portion of the bolt 1 is threaded as at 4 and this portion is provided with several (preferably 3) longitudinally disposed peripheral grooves 5.

The nut 6 which is used in conjunction with the bolt as hereinbefore described is provided with the usual threaded opening 7 adapted to engage the bolt 1. A shoulder 8 is formed at the outer face of the nut 6 and is provided with an aperture 9 which extends through from one side to the other of the said shoulder and which is disposed transversely with relation to the opening 7 in the nut. A flat spring 10 is provided at one end with a reduced shank 11 which is passed through the aperture 9 and the outer extremity of the said shank is bent down against the outer edge of the shoulder 8 as at 12. Shoulders 13 formed at the inner end of the shank 9 bear against the opposite edge of the shoulder 8 from that edge against which the extremity 12 bears. The inner portion of the spring 10 is curved downwardly and the inner corner of the spring 10 is rounded or cut away as at 14. The inner portion of the spring 10 is provided with an opening 15. An abutment 16 is formed upon the outer face of the nut 6 and is provided with an opening 17. The abutment 16 is located at the opposite side of the opening 7 in the nut 6 from the shoulder 8 hereinbefore described.

A locking device is provided in conjunction with the parts hereinbefore described and said device consists of a bar 18 having shoulders 19 and reduced extremities 20.

To lock the nut upon the bolt the following operation is carried out: The bolt 1 is passed through the object or objects that support the same and the nut 6 is screw threaded upon the outer edge portion of the thread 4 in the usual manner. When the rounded corner portion 14 of the spring 10 engages the tapered end 3 of the bolt 1 the free end portion of the spring 10 is moved away from the axis of the bolt 1. Also the said rounded portion 14 serves as means for lifting the free end of the spring 10 over the thread 4 of the said bolt 1. When the nut has been screwed upon the bolt as tight as desired the free end portion of the spring 10 will lie in one of the grooves 5 and inasmuch as the spring 10 is held by the shoulders 13 and the extremity 12 against longitudinal movement in the shoulder 8, the nut 6 cannot turn reversely or unscrew from the bolt. As soon as the free end of the spring 10 is lifted above the edges of the grooves 5 the said nut 6 may be readily unscrewed from the bolt.

To lock the nut 6 in position upon the bolt 1, one of the reduced ends 20 of the bar 18 is inserted in the opening 17 provided in the abutment 16 and the other extremity 20 of the said bar is placed just above the opening 15 in the spring 10. A blow is then struck upon the intermediate portion of the bar 18 and as one of the shoulders 19 bears against the inner face of the abutment 16 the said bar cannot move toward the abutment, but that end thereof which is against the spring 10 will flex the intermediate portion of the said spring inwardly or downwardly, whereby the end portion 20 which is in contact with the spring will fly into the opening 15 provided in the said spring. As the intermediate portion of the spring 10 attempts to assume its normal position the bar 18 is bound in position between the abutment 16 and the said spring and consequently the said spring cannot be lifted out of engagement with the groove in the nut until the said bar has been mutilated or destroyed and removed.

Having thus described the invention, what is claimed as new is:

1. In combination with a bolt having a longitudinally disposed groove, a nut adapted to screw thereon and having a shoulder, a spring carried by the shoulder and having a free end portion adapted to enter the groove in the bolt, said nut also having an abutment, the spring and the abutment being provided with openings, and a locking bar having reduced ends adapted to be sprung in position in the openings in the abutment and said spring.

2. In combination with a bolt having a longitudinally disposed groove, a nut adapted to screw thereon and having a shoulder provided with an aperture, a spring passing through said aperture and having at its opposite edges shoulders which bear against the edge of the first mentioned shoulder, said spring having a downturned end lying against the opposite edge of the first mentioned shoulder, said nut having an abutment spaced from the shoulder mounted upon the nut, and a bar adapted to be interposed between said abutment and the free end portion of the spring to hold the same in engagement with the groove in the bolt.

In testimony whereof, I affix my signature in presence of two witnesses.

MARTIN F. PANE. [L. S.]

Witnesses:
 CHARLIE W. PANE,
 GODFREY GUTKNECHT.

---

Copies of this patent may be obtained for five cents each, by addressing the "Commissioner of Patents, Washington, D. C."